United States Patent
Dammeyer (12) 
(10) Patent No.: US 6,564,897 B2
(45) Date of Patent: May 20, 2003

(54) SYNCHRONIZED/VARIABLE FORCE FEEDBACK POWER STEERING

(75) Inventor: Ned E. Dammeyer, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 45 days.

(21) Appl. No.: 09/793,001

(22) Filed: Feb. 26, 2001

(65) Prior Publication Data

US 2001/0042655 A1 Nov. 22, 2001

Related U.S. Application Data (60) Provisional application No. 60/186,160, filed on Feb. 29, 2000.

(51) Int. Cl.$^7$ ................................................. B62D 5/00

(52) U.S. Cl. ........................ 180/402; 180/403; 701/41; 701/42

(58) Field of Search ................................. 180/402, 403; 701/41, 42

(56) References Cited

U.S. PATENT DOCUMENTS

| | | |
|---|---|---|
| 5,067,576 A | 11/1991 | Bober |
| 5,247,441 A | 9/1993 | Serizawa et al. |
| 5,347,458 A | 9/1994 | Serizawa et al. |

(List continued on next page.)

FOREIGN PATENT DOCUMENTS

| | | |
|---|---|---|
| EP | 0 872 405 A2 | 10/1998 |
| EP | 1 013 537 A2 | 6/2000 |

OTHER PUBLICATIONS

Roy McCann; Variable Effort Steering for Vehicle Stability Enhancement Using an Electric Power Steering System; SAE Technical Paper Series; Mar. 6–9, 2000; 2000–01–0817; Society of Automotive Engineers, Inc.; Warrendale, PA.

Stephen N. Rohr, et al; An Integrated Approach to Automotive Safety Systems; SAE Technical Paper Series; Mar. 6–9, 2000; 2000–01–0346; Society of Automotive Engineers, Inc.; Warrendale, PA.

E–H–Steer Electro–Hydraulic Power Steering Product Brochure; Delphi Automotive Systems; Saginaw, MI; 1998; available at Delphi Automotive Systems website at www.delphiauto.com/pdf/steeringpdfs/DS–E020.pdf.

(List continued on next page.)

*Primary Examiner*—Lesley D. Morris
*Assistant Examiner*—L. Lum
(74) *Attorney, Agent, or Firm*—Stevens & Showalter LLP (57) ABSTRACT

A steering tiller and a steered wheel(s) of a steer-by-wire steering system of a materials handling vehicle are synchronized with one another and a virtual coupling force is exerted on the steering tiller to maintain synchronization. A motor or brake is associated with the steering tiller and the positions of the tiller and the steered wheel(s) are monitored and used to control the motor or brake to apply the virtual coupling force to the tiller. Thus, an operator of the vehicle receives feedback corresponding approximately to that experienced in a mechanically coupled steering system so that synchronism is maintained between the tiller and the steered wheel(s). In this way, if the operator attempts to oversteer or outrun the steered wheel(s) by rapid rotation of the tiller, a force proportional to the operator's action is applied to oppose that action. Synchronization can be set up with the tiller set to a desired position selected by the operator, for example to selected a desired tiller spinner straight ahead position.

9 Claims, 4 Drawing Sheets

U.S. PATENT DOCUMENTS

| | | |
|---|---|---|
| 5,576,956 A | 11/1996 | Ashizawa et al. |
| 5,835,870 A | 11/1998 | Kagawa |
| 5,908,457 A | 6/1999 | Higashira et al. |
| 6,041,882 A | 3/2000 | Bohner et al. |
| 6,059,068 A | 5/2000 | Kato et al. |
| 6,079,513 A | 6/2000 | Nishizaki et al. |
| 6,082,482 A | 7/2000 | Kato et al. |
| 6,089,344 A | 7/2000 | Baughn et al. |
| 6,091,214 A | 7/2000 | Yamawaki et al. |
| 6,097,286 A | 8/2000 | Discenzo |
| 6,112,845 A | 9/2000 | Oyama et al. |
| 6,112,846 A | 9/2000 | Mukai et al. |
| 6,116,372 A | 9/2000 | Mukai et al. |
| 6,138,788 A | 10/2000 | Bohner et al. |
| 6,290,010 B1 | 9/2001 | Roudet et al. |

OTHER PUBLICATIONS

E–Steer Electric Power Steering Product Brochure; Delphi Automotive Systems; Saginaw, MI; 1998; available at Delphi Automotive Systems website at www.delphiauto.com/pdf/steeringpdfs/DS98E019.pdf.

Chassis Systems Product Information Electrically Assisted Steering; TRW; available from TRW website at www.trw.com by navigating through these links: Products/Services>Automotive>Chassis Systems> Product Information>Electrically Assisted Steering (EAS)>Related Information Electrically Assisted Steering (EAS).

SYNCHRONIZED/VARIABLE FORCE FEEDBACK POWER STEERING

CROSS REFERENCE TO RELATED APPLICATIONS

This application claims the benefit of U.S. Provisional Patent Application No. 60/186,160 filed Feb. 29, 2000, and entitled SYNCHRONIZED/VARIABLE FORCE FEEDBACK POWER STEERING, which is incorporated herein by reference.

BACKGROUND OF THE INVENTION

The present invention relates in general to steering systems for materials handling vehicles and, more particularly, to a steer-by-wire power steering system wherein the steered wheel or wheels and the steering wheel or tiller are synchronized with one another and a virtual coupling force is exerted on the steering tiller to maintain synchronization.

In existing steer-by-wire steering systems used on materials handling vehicles, some resistance is provided against rotation of the steering tiller. However, the steering tiller resistance is not related to the speed of rotation of the tiller or whether the tiller advances beyond the position of the steered wheel(s). The tiller and the steered wheel(s) seem to be coupled as long as the operator does not outrun the steered wheel(s), i.e., the operator does not move the tiller so rapidly that the steered wheel(s) cannot keep up with the movement requested by the tiller. If the tiller is turned too rapidly and outruns the steered wheel(s), there is no feedback to the operator indicating that the steering tiller is outrunning the steered wheel(s) and the steered wheel(s) is not synchronized with the tiller position.

It is desired to make the steer-by-wire steering on materials handling vehicles more closely resemble the properties of a mechanically coupled steering system.

SUMMARY OF THE INVENTION

In accordance with the present invention, to provide synchronization or coupling of a steering tiller of a materials handling vehicle and the steered wheel(s), even though the two are not mechanically coupled, a motor or brake is associated with the steering tiller and used to provide a force representative of a difference between the steering position selected by the steering tiller and the actual position of the steered wheel(s). Absolute position monitoring is provided for both the steering tiller and the steered wheel(s) with outputs from the associated absolute position monitors being provided to a controller which is programmed to operate the motor or brake to oppose rotation of the tiller if the steering tiller is rotated too rapidly, i.e., at a rate that is faster than the steered wheel(s) can be turned, and if the steered wheel(s) reach a mechanical stop. The steering system of the present invention thus simulates mechanically coupled steering systems and also enables a variety of startup scenarios to take place. For example, an operator can select a desired steering tiller position to correspond to the straight ahead steer position for the vehicle.

DETAILED DESCRIPTION OF THE INVENTION

The steering arrangement of the present application relates to steer-by-wire steering systems for materials handling vehicles. For a better understanding of the environment of the present invention, reference will initially be made to FIGS. 1 and 2 which illustrate a turret stockpicker. While the invention is described with reference to a turret stockpicker, it will be apparent from this disclosure that the present invention can be used for a wide variety of materials handling vehicles including turret sideloaders, reach trucks, order pickers, etc. The illustrated vehicle includes a power unit 10, a load handling assembly 20, and a platform assembly 30. The power unit 10 includes a power source, such as a battery unit 12, a pair of load wheels 14 positioned under the platform assembly 30, a pair of steered wheels 15 positioned under the rear end of the power unit 10, with each wheel being driven by a traction motor, and a mast 17 on 20 which the platform assembly 30 rides.

Figure 1:
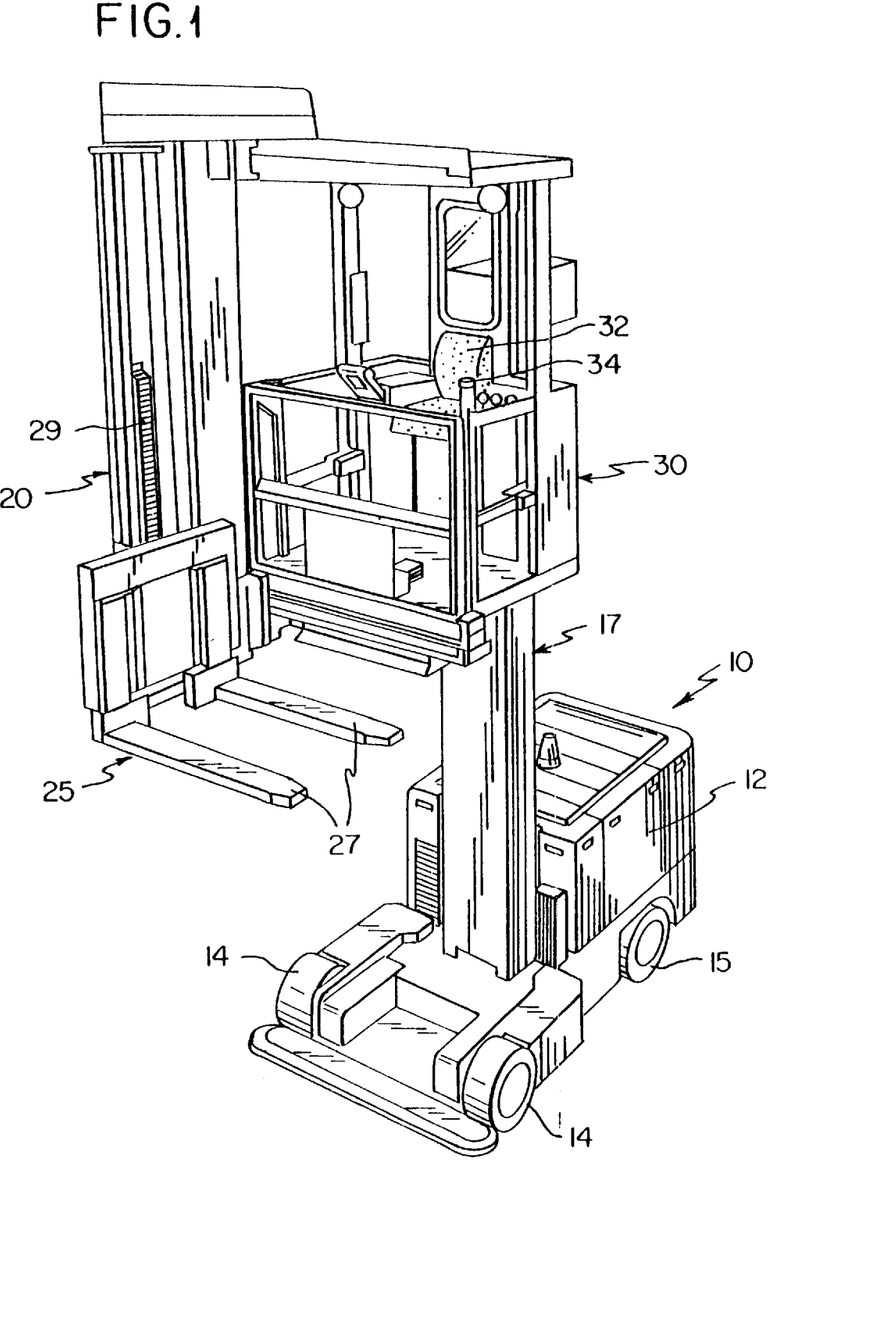
FIG. 1 is a perspective view of a materials handling vehicle for which the synchronized/variable force feedback power steering present invention can be used.

The load handling assembly 20 includes a fork carriage assembly 25 which may be raised and lowered and also rotated relative to the load handling assembly 20. A pair of extendable forks 27 are carried by the fork carriage assembly 25. The fork carriage assembly 25 may be raised from the position shown by means of an auxiliary lift cylinder 29 to place the forks 27 at a convenient height for the operator to place individual packages on the forks 27 when the vehicle is being used in this mode, or to move the forks 27 upwardly, without moving the platform assembly 30 itself, when lifting pallets from a rack adjacent the aisle where the vehicle is operating.

Figure 2:
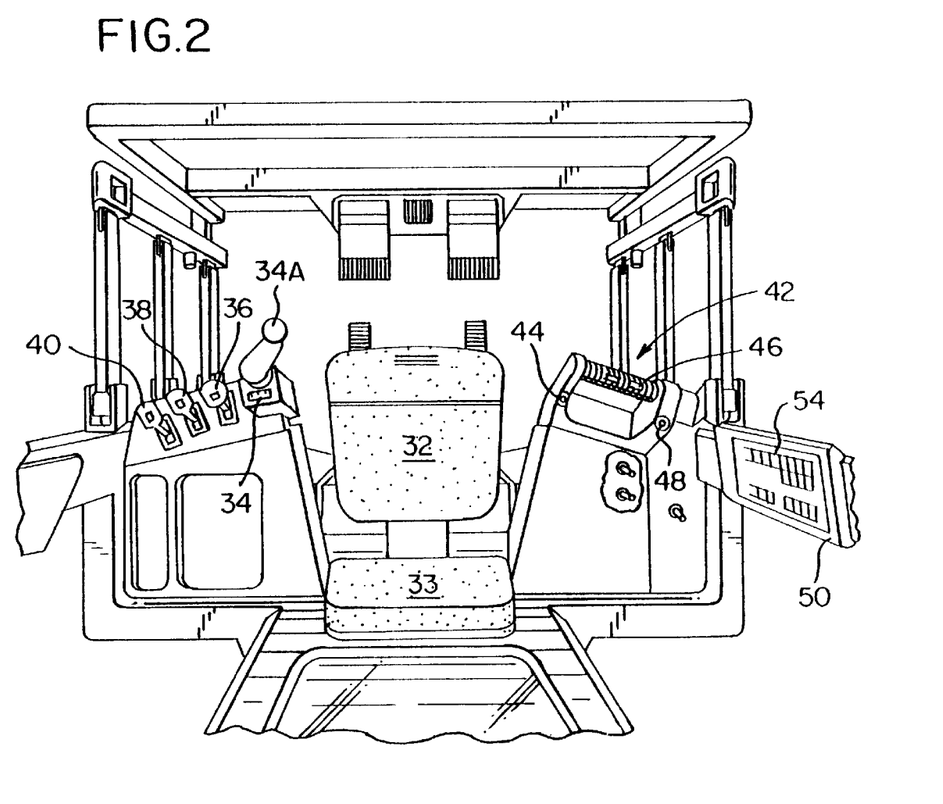
FIG. 2 is a plan view of the operator's compartment of the materials handling vehicle of FIG. 1.

The platform assembly 30 includes a seat 32 and a back rest 33, from which the operator can operate various controls, see FIG. 2. On the operator's left, the controls include a steering tiller 34, a fork raise and lower control 36, a fork traverse, retract and extend control 38, and a pivot control 40. On the right, the operator is provided with a traction motor control 42, which includes a horn switch 44, an accelerator twist grip and palm switch 46, and a power disconnect switch 48. An indicator control panel 50 to the right of the operator includes various indicator lamps and control switches, such as a parking brake switch 54.

Historically, steer-by-wire electric steering on a materials handling vehicle, such as the vehicle of FIGS. 1 and 2, has been implemented using a first incremental encoder coupled to the steering tiller and a second incremental encoder coupled to the steered wheel(s) to provide feedback indicating the direction of the steered wheel(s). A "wheel(s) centered" indicating device coupled with the steered wheel (s) generated a wheel(s) centered signal whenever the steered wheel(s) were directed straight ahead. Tachometers also have been used on the steering tiller and potentiometers have been used on the steered wheel(s).

Incremental encoders and tachometers are not absolute position devices so that a system using such sensors is unable to determine the positions of the sensors/associated apparatus at startup. Thus, the steer-by-wire system was unable to determine the absolute or actual position of the incremental encoder used on the steered wheel(s) at startup and only determined its actual position, and hence the position of the steered wheel(s), after the steered wheel(s) passed through the straight ahead position so that the centered signal was generated. Other position sensing devices, such as potentiometers, sense the absolute position of an element whose position is being monitored.

In the present invention, absolute position sensing is used for both the steering command function, generated by the steering tiller 34, and also for the steered wheel feedback indicating the position of the steered wheels 15. The present invention is able to provide a "coupled" feel for a steer-by-wire steering system so that the position of the spinner 34A on the steering tiller 34 can be synchronized or "coupled" to the direction the steered wheels 15 are pointing. In addition, a virtual coupling force is applied to the steering tiller 34 such that the force needed to be applied to the steering tiller 34 to turn it, is related to the relative position between the tiller 34 and the steered wheels 15. If an operator tries to turn the steering tiller 34 so rapidly that it outruns the steered wheels 15, i.e., the operator tries to move the tiller 34 so rapidly that the steered wheels cannot keep up with the movement requested by the tiller 34, the force needed to turn the steering tiller 34 is increased in accordance with the amount of the outrun so that the operator should not be able to do so.

Figure 3:
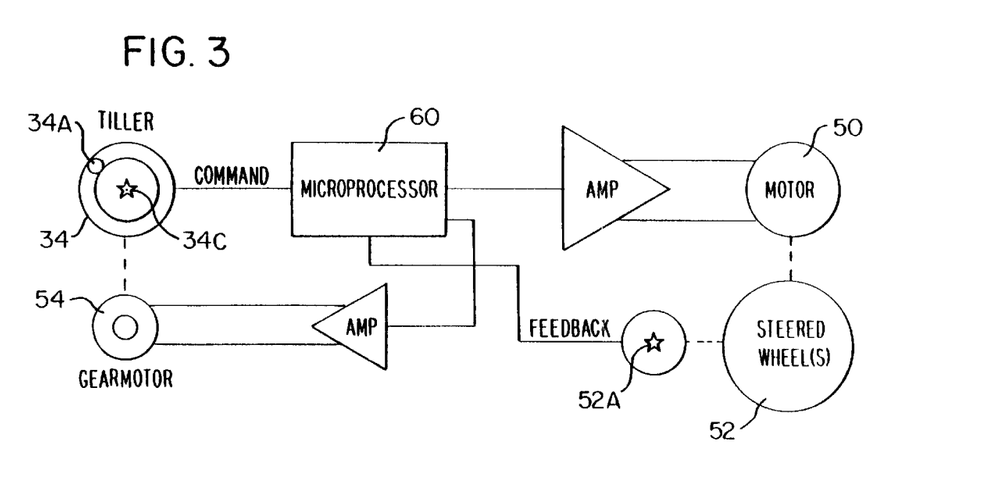
FIG. 3 is a schematic block diagram of a first embodiment of the synchronized/variable force feedback power steering of the present invention.
Figure 4:
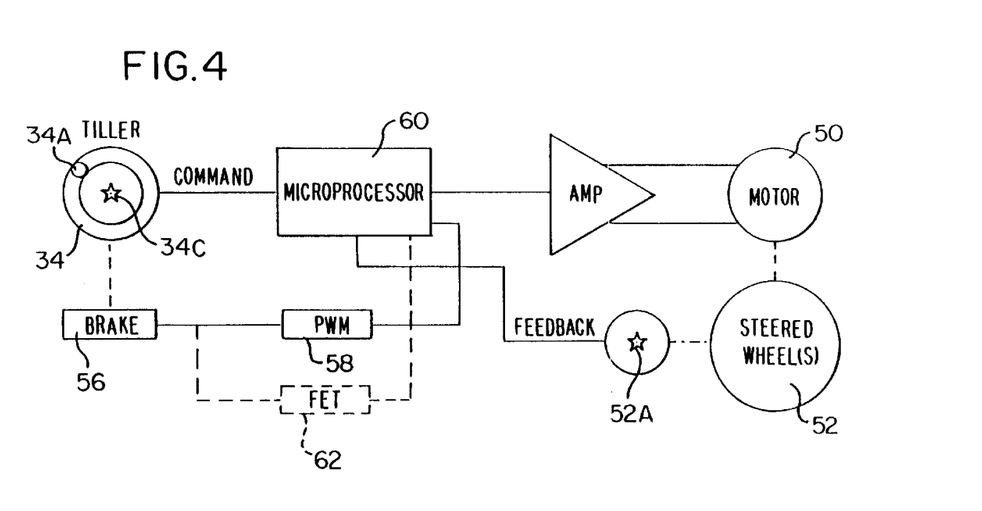
FIG. 4 is a schematic block diagram of a second embodiment of the synchronized/variable force feedback power steering of the present invention.

Reference will now be made to FIGS. 3 and 4. Operation of a steering motor 50 to turn the steered wheel(s) 52 is brought about by the operator moving the tiller 34 and thus causing an offset or error between the actual position of the steering tiller 34 and the position of the steered wheel(s) 52, i.e, an error in the alignment between the position of the tiller 34 and the position of the steered wheel(s) 52. The position of the steering tiller 34 is determined using an absolute position monitoring device 34C, such as a potentiometer or a specially configured encoder, that generates a signal, Command in FIG. 3. Similarly, the position of the steered wheel(s) 52 is determined using an absolute position monitoring device 52A that generates a signal, Feedback in FIG. 3. The offset results in the steered wheel(s) 52 being turned to eliminate the offset.

In accordance with the present invention, the offset is also used to determine a counter steering resistive force which is applied to the steering tiller 34 to oppose the operator when a sufficiently large error or misalignment of the steering tiller 34 and the steered wheel(s) 52 occurs, for example, the resistive force can be commenced when the error or misalignment is about 3% of the total turning range of the steered wheel(s), i.e., about 5° out of a possible 180°. The actual error or misalignment for commencing the counter steering resistive force can range from 0° to about 10° depending, at least in part, on how the counter steering force is increased, e.g., linearly, exponentially, in incremental steps or as otherwise is determined to be appropriate to substantially eliminate overrun of the steering tiller 34 relative to the steered wheel(s) 52.

Two alternate embodiments for implementing the present invention are illustrated in FIGS. 3 and 4. In FIG. 3, a motor 54 is coupled to the steering tiller 34 so that the counter steering resistive force (counter rotation force or drag force or "force feedback") is provided to the tiller 34, and hence to the operator, by operation of the motor 54. The motor 54 can also be operated to position the steering tiller 34 to be synchronized with the steered wheel(s) 52 when the vehicle is turned on, i.e, at key on. Alternately, the steering motor 50 can be operated to position the steered wheel(s) 52 to a position between mechanical end stops (not shown) to synchronize the steered wheel(s) 52 with the position of the steering tiller 34. If one of the mechanical end stops is engaged by the steered wheel(s) 52 during this positioning operation of the wheels 52, the motor 54 is then operated to position the steering tiller 34 so that it is synchronized with the steered wheel(s) 52, i.e., so that the steering tiller 34 is moved to correspond to the stop position which is engaged by the steered wheel(s).

By using absolute position sensing on both the tiller 34 and the steered wheel(s) 52, an error signal is generated such that if the tiller 34 and the steered wheel(s) 52 are going out of synchronization, i.e., the operator is turning the tiller 34 faster than the steered wheel(s) 52 can be rotated, the motor 54 opposes further rotation of the tiller 34 until the error is reduced, for example substantially to zero, and the tiller 34 and steered wheel(s) 52 again become synchronized or "coupled". Also, since the steered wheel(s) 52 has end of rotation mechanical stops, the motor 50 provides torque to essentially stop the tiller 34 from rotating once these stops are encountered by the steered wheel(s) 52 so that the tiller 34 and the steered wheel(s) 52 remain substantially "coupled". The motor 54 can also be controlled to provide a normal drag counter rotation force, commonly designed into the tiller assembly, thus eliminating the typical spring-loaded drag components.

In FIG. 4, an electromagnetic brake 56 is coupled to a shaft of the tiller 34 to apply the counter steering resistive force (counter rotation force or drag force or "force feedback") to the tiller 34 to resist rotation of the tiller 34. The force applied to the tiller 34 by the brake 56 is comparable to the force generated by operation of the motor 54 shown in FIG. 3. For initial synchronization of the tiller 34 and the steered wheel(s) at key on, the steered wheel(s) 52 are driven to a defined position, for example, the steered wheel(s) 52 can be driven to the straight ahead position for the materials handling vehicle, to the current position of the tiller 34 to become coupled, or to any desired initial position. The present invention also enables the operator to select the position of the spinner 34A on the tiller 34 that corresponds to the straight ahead position of the materials handling vehicle by moving the tiller 34 to the desired or selected straight ahead position prior to key on and then driving the steered wheel(s) 52 to straight ahead at key on.

The counter steering resistive force (counter rotation force or drag force or "force feedback") supplied by the brake 56 opposes the efforts of the operator to rotate the tiller 34 faster than the steered wheel(s) 52 can be turned, and effectively stops the tiller 34 if the steering wheel(s) 52 encounters the mechanical stops. Of course, rotation of the tiller 34 is permitted to a limited extent when the steered wheel(s) is at the mechanical stops so that the wheel(s) can be move away from the mechanical stops. Alternately, the counter steering resistive force can be increased over a limited travel range when the steered wheel(s) are approaching the mechanical stops to indicate the approach of the mechanical stops to the operator. For example, the last 10° of tiller travel in either direction can be designated as mechanical stop zones so that an end of travel counter steering force is applied to the tiller 34 in the same manner that the force is applied for an operator turning the tiller 34 so rapidly as to attempt to outrun the steered wheel(s) 52. Of course, steering ranges other than the last 10° of tiller travel can be used for this purpose as well as differing force profiles.

A pulse width modulation PWM control circuit 58 is used to control the brake 56. Alternately, a modulated control signal from a microprocessor 60 can be used to appropriately control a power field effect transistor (FET) driver 62 to control the brake 56. The force applied by the brake 56 can be controlled in incremental steps or as a linear, exponential or other appropriate function of the error between the actual position of the steering tiller 34 and the position of the steered wheel(s) 52 to substantially eliminate overrun of the steering tiller 34 relative to the steered wheel(s) 52. The brake 56 can also be applied to provide a normal drag counter rotation force that is commonly designed into the tiller assembly thus eliminating the typical spring-loaded drag components.

Figure 5:
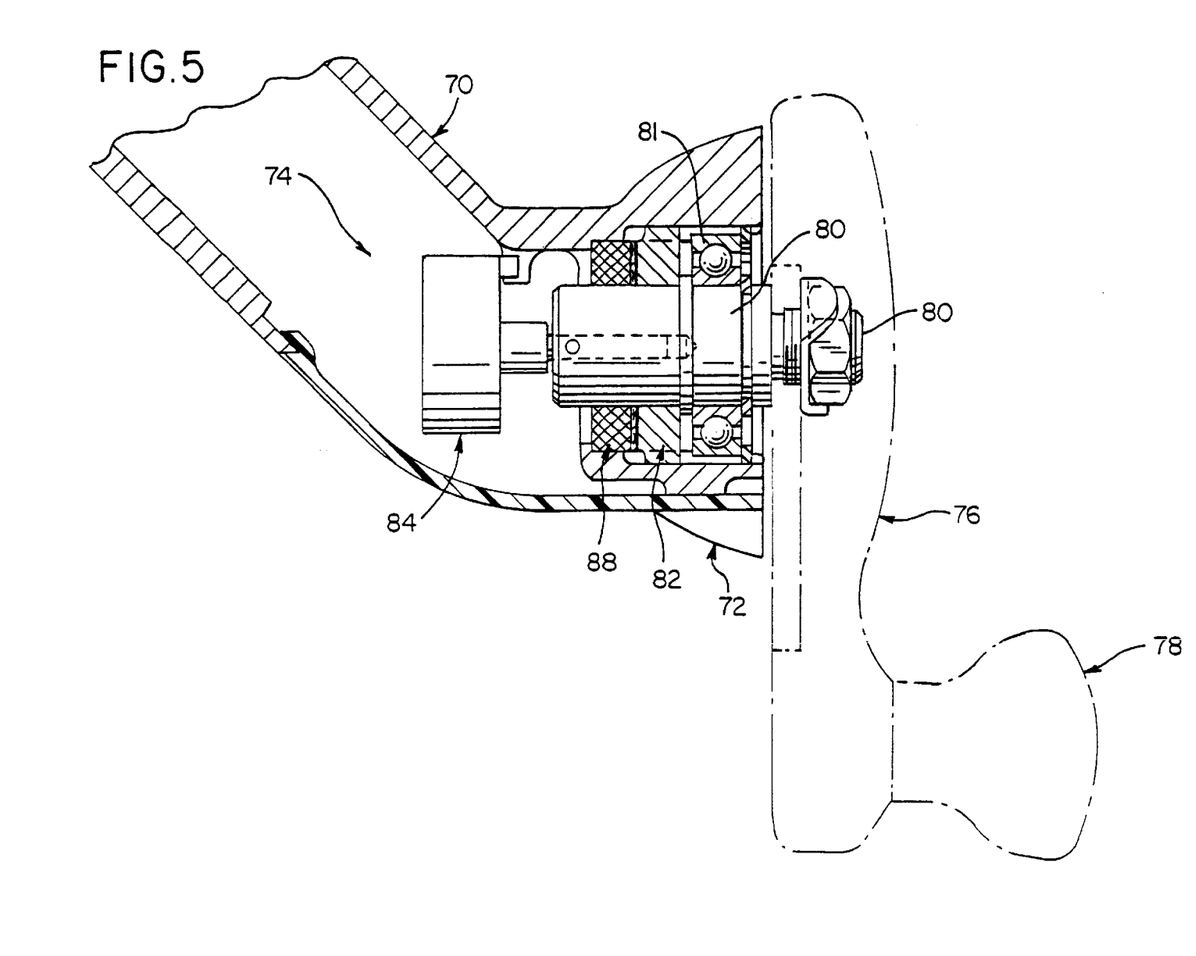
FIG. 5 shows an implementation of a brake controlled steering system in accordance with the present invention into a tiller assembly of a materials handling vehicle.

FIG. 5 illustrates an implementation of a brake controlled steering system in accordance with the present invention into a tiller assembly of a materials handling vehicle, a reach truck manufactured by Crown Equipment Corporation and designated as an RR or rider reach truck. The brake implementation of FIG. 5 illustrates a steering housing 70 including an access cover 72 having a tiller control and brake assembly 74 fitted inside the housing 70. A steering tiller 76 having a spinner 78 is mounted to a steering shaft 80 supported for rotation by a bearing 81. A brake body 82 is mounted to the housing 70 as is an absolute position monitoring device 84, such as a potentiometer or an absolute encoder. The monitoring device 84 has a shaft 86 attached to the shaft 80 for rotation therewith. A brake armature 88 is also attached to the shaft 80 so that a braking force is applied to the shaft 80, and hence the tiller 76 and spinner 78, when the brake armature 88 is activated.

A typical torque value for turning a tiller on a turret stockpicker truck is pound inches which is the amount of torque required to overcome a steering drag mechanism built into the tiller. For example, if the tiller has a 4 inch radius, a force of 1.25 pounds must be applied by the operator to steer the vehicle. If a resistive force of 60 pound inches is supplied by the motor 54 or the electromagnetic brake 56, a turning effort of 15 pounds is required to be applied by the operator to overrun the maximum steer rate of the steered wheel(s) 52. Of course, the motor 54 and the brake 56 can be selected to provide any reasonable force required for desired operation of a steer-by-wire operating system including the present invention.

Additional features which can be included in the power steering system of the present application include:

1. Reducing the number of revolutions required for the tiller 34 in moving the steered wheels from lock to lock. Typically, for materials handling vehicles, the tiller 34 is rotated +/−3 turns (6×360° for total rotation of 2160°) for rotation of the steered wheel(s) 52 from lock to lock (steered wheels 52 turn +/−90° for total rotation of 180°). By limiting the amount of mechanical rotation of the tiller 34 to approximately +/−1 revolution (700° total), operator fatigue is reduced since fewer turns of the tiller 34 are required for operation of the vehicle. In addition, while the steering system of the present application should prevent the tiller 34 from becoming out of synchronization with the steered wheel(s) 52, if the vehicle is abused by overpowering the counter steering resistive force, the amount of out of synchronization or out of coupling between the tiller 34 and the steered wheel(s) 52 is limited. Also, the limited amount of mechanical rotation of the tiller 34 reduces a gear ratio required for the absolute position sensor for the tiller 34 and improves resolution of the sensor per degree of tiller movement. However, steering sensitivity must be controlled as a function of steer angle as illustrated below:

Thus, the steering sensitivity must be reduced for small steer angles, for example steer angles of approximately ±10° from straight ahead. Steering sensitivity is increased gradually for steer angles greater than approximately ±10° with the increase being either linear, as shown above, in small steps or otherwise so as to be unnoticeable by an operator of the vehicle. While ±10° from straight ahead is suggested as a range of steering for reduced steering sensitivity, other ranges can be used as well. The resistive force provided by either the motor 54 or the brake 56 still functions as a retarding force which opposes turning of the steering tiller 34 when the operator tries to outrun or out-steer the system so that under almost all instances the synchronzation or coupling between the tiller 34 and the steered wheel(s) 54 is maintained.

2. Allow the tiller 34 to have free range, no limitations, except the resistive force supplied by the brake 56 or the motor 54. At key on, prior to "startup" the operator rotates the tiller 34 to his/her choice of position for the wheel(s) 52. The vehicle display informs the operator to position the tiller 34 in the direction the vehicle will initially be steered. At key on/startup, the steered wheel(s) 52 is driven to the position of the tiller 34. During normal operation the system would remain "coupled".

3. Same as 2 above except that the position of the tiller 34 selected by the operator is the straight ahead position and the steered wheel(s) 52 is driven to straight ahead.

4. Same as 3 above except that if the counter steering resistive force is supplied by the motor 54, both the tiller 34 and the steered wheel(s) 52 can be driven to the straight ahead position. With regard to 2 above, if no tiller position is selected by the operator, the tiller 34 and the steered wheel(s) 52 can be driven toward one another to bring the two into synchronization.

5. During all of arrangements 1–4 above, if the operator over powers or outruns the steering system, when the operator stops turning the tiller 34, the steered wheel(s) 52 also stop turning, and the system begins operating with an offset that is present when the tiller 34 stopped turning. This offset remains until the operator steps off the vehicle, which is detected by an operator presence switch (not shown), and after a time delay, the steered wheel(s) 52 is driven to the position of the tiller 34, or the vehicle is turned off and back on at which time the tiller 34 and the steered wheel(s) 52 are synchronized with one another, for example as described in 2, 3 or 4 above.

6. As the vehicle is operating and as the tiller 34 is rotated, the system is allowed to slip in a first direction which reduces offset error between the tiller 34 and the steered wheel(s) 52 but is not allowed to slip in the second, opposite direction which increases offset error between the tiller 34 and the steered wheel(s) 52 so that the offset error is gradually reduced, ultimately to zero offset error. When the motor 54 is coupled to the steering tiller 34, a small bias is applied to the motor drive in a direction which reduces offset error between the tiller 34 and the steered wheel(s) 52 to provide a small "push" rather than a slip so that the offset error is again gradually reduced to zero.

7. Ideally, the counter resistive steering force applied by either the brake 56 or the motor 54 are sufficient to prevent the tiller 34 from becoming unsynchronized relative to the steered wheel(s) 54.

Having thus described the invention of the present application in detail and by reference to preferred embodiments thereof, it will be apparent that modifications and variations are possible without departing from the scope of the invention defined in the appended claims.

What is claimed is:

1. A method for operating a steer-by-wire power steering system for a materials handling vehicle comprising the steps of:

monitoring angular position of a steering tiller for said materials handling vehicle;

monitoring angular position of a steered wheel for said materials handling vehicle;

determining a difference between the position of said steering tiller and the position of said steered wheel; and generating a counter rotation force that opposes turning of said steering tiller by an operator of said materials handling vehicle in response to said difference by braking said steering tiller.

2. A method for operating a steer-by-wire power steering system for a materials handling vehicle as claimed in claim 1 further comprising the step of synchronizing the positions of said steering tiller and said steered wheel to one another.

3. A method for operating a steer-by-wire power steering system for a materials handling vehicle as claimed in claim 2 wherein said step of synchronizing the positions of said steering tiller and said steered wheel to one another comprises the steps of:

slipping said steering system for movements of said system in a direction which reduces offset error between said steering tiller and said steered wheel; and preventing slip of said steering system for movements of said system in a direction which increases offset error between said steering tiller and said steered wheel.

4. A method for operating a steer-by-wire power steering system for a materials handling vehicle comprising the steps of:

monitoring angular position of a steering tiller for said materials handling vehicle;

monitoring angular position of a steered wheel for said materials handling vehicle;

moving said steering tiller to a position preferred by an operator of said materials handling vehicle to correspond to a defined steered wheel position;

moving said steered wheel to said defined steered wheel position; and setting said preferred tiller position and said defined steered wheel position to correspond to one another so that movements of said steered wheel are made from said defined steered wheel position in correspondence with movement of said steering tiller from said operator preferred position.

5. A method for operating a steer-by-wire power steering system for a materials handling vehicle as claimed in claim 4 wherein said step of moving said steering tiller is performed at key on prior to startup of said materials handling vehicle and said step of moving said steered wheel is performed upon startup of said materials handling vehicle.

6. A method for operating a steer-by-wire power steering system for a materials handling vehicle as claimed in claim 5 wherein said step of moving said steering tiller is performed manually by said operator.

7. A method for operating a steer-by-wire power steering system for a materials handling vehicle as claimed in claim 4 wherein said defined steered wheel position corresponds to straight ahead movement for said materials handling vehicle.

8. A method for operating a steer-by-wire power steering system for a materials handling vehicle comprising the steps of:

monitoring angular position of a steering tiller for said materials handling vehicle;

monitoring angular position of a steered wheel for said materials handling vehicle;

moving said steered wheel toward the position of said steering tiller; and synchronizing said steered wheel and said steering tiller upon the position of said steered wheel substantially matching the position of said steering tiller.

9. A method for operating a steer-by-wire power steering system for a materials handling vehicle as claimed in claim 8 further comprising the step of operating a motor to move said steering tiller toward the position of said steered wheel.

* * * * *

UNITED STATES PATENT AND TRADEMARK OFFICE
CERTIFICATE OF CORRECTION

PATENT NO. : 6,564,897 B2
DATED : May 20, 2003
INVENTOR(S) : Ned E. Dammeyer

It is certified that error appears in the above-identified patent and that said Letters Patent is hereby corrected as shown below:

Column 2,
Line 26, "mast 17 on 20 which" should read -- mast 17 on which --;

Column 3,
Line 21, "steered wheels cannot" should read -- steered wheels 15 cannot --;
Line 48, "about 50 out" should read -- about 5º out --;

Column 5,
Line 30, "is pound inches" should read -- is 5 pound inches --.

Signed and Sealed this

Sixteenth Day of March, 2004

JON W. DUDAS
*Acting Director of the United States Patent and Trademark Office*